(12) United States Patent
Mercat

(10) Patent No.: US 10,737,741 B2
(45) Date of Patent: Aug. 11, 2020

(54) SKEWER AND HUB FOR CYCLE WHEEL

(71) Applicant: MAVIC S.A.S, Metz-Tessy (FR)

(72) Inventor: Jean-Pierre Mercat, Chavanod (FR)

(73) Assignee: MAVIC S.A.S., Metz-Tessy (FR)

( * ) Notice: Subject to any disclaimer, the term of this patent is extended or adjusted under 35 U.S.C. 154(b) by 740 days.

(21) Appl. No.: 15/195,305

(22) Filed: Jun. 28, 2016

(65) Prior Publication Data

US 2016/0375950 A1    Dec. 29, 2016

(30) Foreign Application Priority Data

Jun. 29, 2015  (FR) ...................................... 15 01362

(51) Int. Cl.
 *B62K 25/02* (2006.01)

(52) U.S. Cl.
 CPC .......... *B62K 25/02* (2013.01); *B62K 2206/00* (2013.01)

(58) Field of Classification Search
 CPC .... B62K 25/02; B62K 2206/00; B60B 27/026
 USPC ...................................................... 301/124.2
 See application file for complete search history.

(56) References Cited

U.S. PATENT DOCUMENTS

| 5,865,560 | A | 2/1999 | Mercat et al. | |
|---|---|---|---|---|
| 6,089,675 | A | 7/2000 | Schlanger | |
| 7,654,548 | B2 * | 2/2010 | Kanehisa | B62K 21/02 |
| | | | | 280/260 |
| 7,735,937 | B2 * | 6/2010 | Chonan | B62K 25/02 |
| | | | | 301/124.2 |
| 8,075,065 | B2 | 1/2011 | Mercat et al. | |
| 2005/0110335 | A1 * | 5/2005 | Rose | B62K 25/02 |
| | | | | 301/124.1 |
| 2009/0102276 | A1 | 4/2009 | Mercat et al. | |
| 2011/0049968 | A1 * | 3/2011 | Jones | B60B 27/026 |
| | | | | 301/124.2 |
| 2013/0270893 | A1 | 10/2013 | Schlanger | |

FOREIGN PATENT DOCUMENTS

| DE | 10 2008 012 573 A1 | 6/2009 |
|---|---|---|
| EP | 0 810 944 B1 | 8/2002 |
| EP | 2 070 725 A1 | 6/2009 |

\* cited by examiner

*Primary Examiner* — Scott A Browne

(74) *Attorney, Agent, or Firm* — Greenblum & Bernstein, P.L.C.

(57) ABSTRACT

A skewer for fixing a wheel to a cycle-type vehicle, comprising a rod extending along a longitudinal axis, a first end that includes structural elements that cooperate with the vehicle frame, and a second end that includes structural elements configured to cooperate with a device exerting a tightening torque, in which the rod includes a groove extending along the longitudinal axis over a first length, an element having a variable diameter and a second length, the second length being less than the first length, is received in the groove so as to be translationally movable along the longitudinal axis, and an elastic biaser longitudinally constrains the variable diameter element towards the second end. The variable diameter element is a split tubular ring whose diameter in the free state is greater than the maximum outer diameter of the rod; it is longitudinally constrained by a spiral spring, and a distribution ring is interposed between the spring and the variable diameter element.

14 Claims, 15 Drawing Sheets

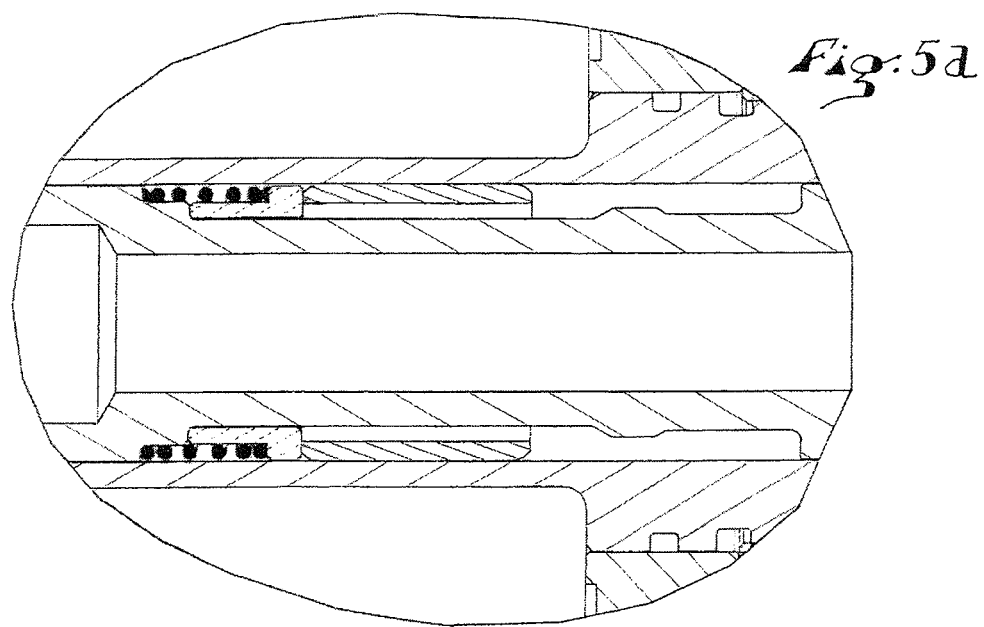
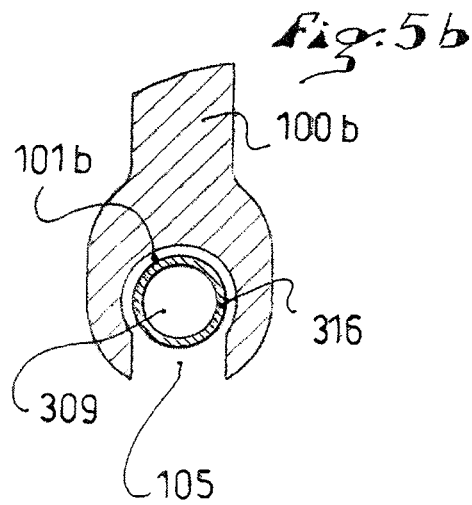
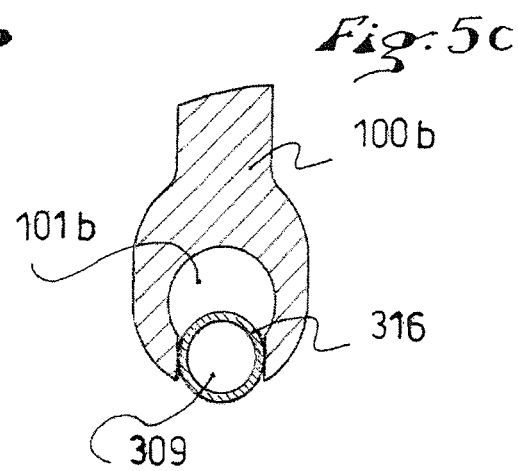
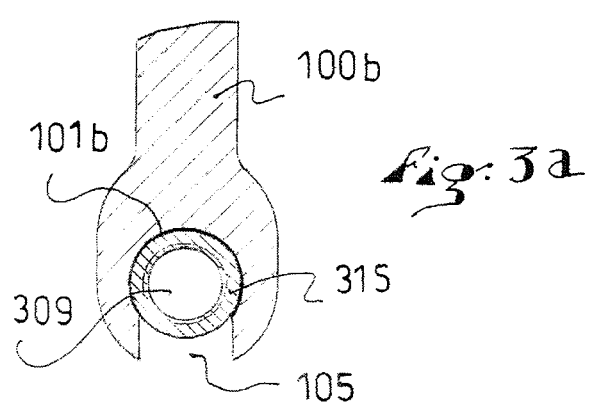

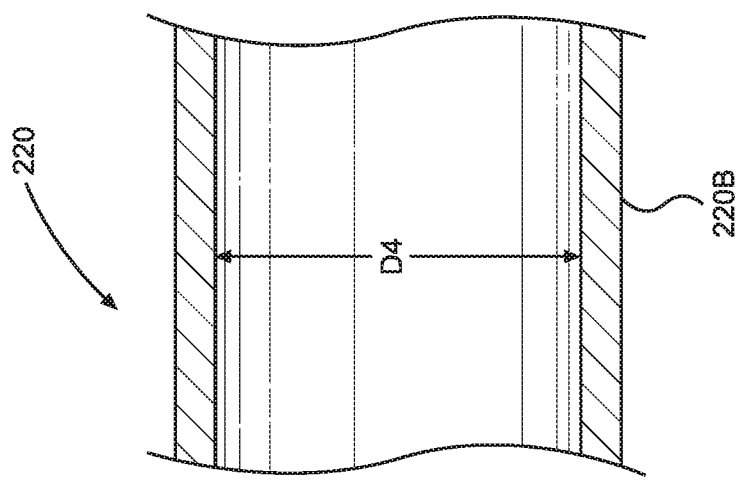
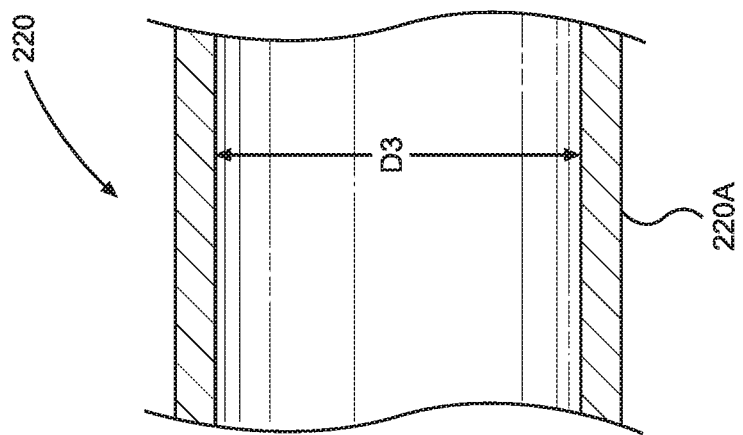
FIG. 4c

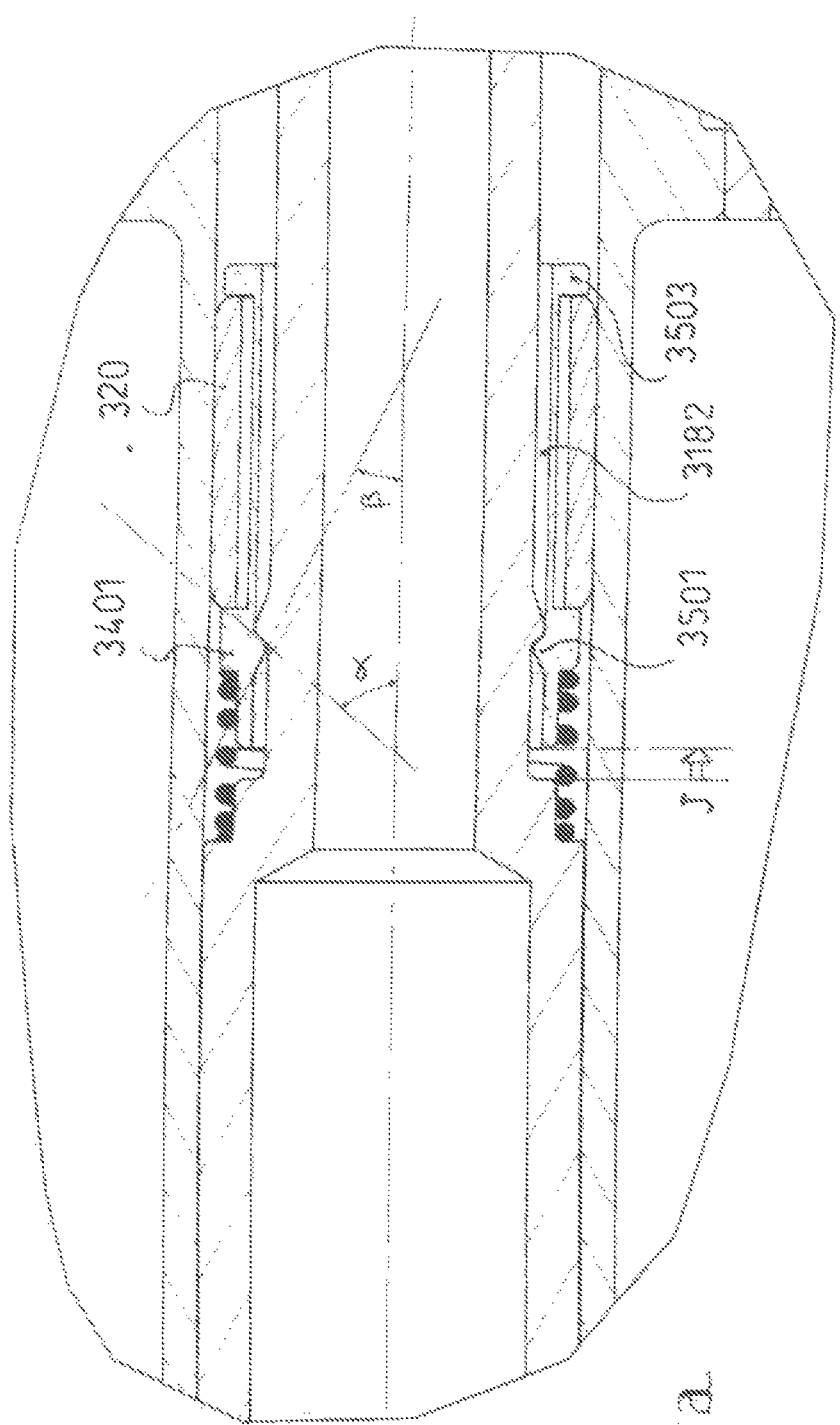

COUPE A-A

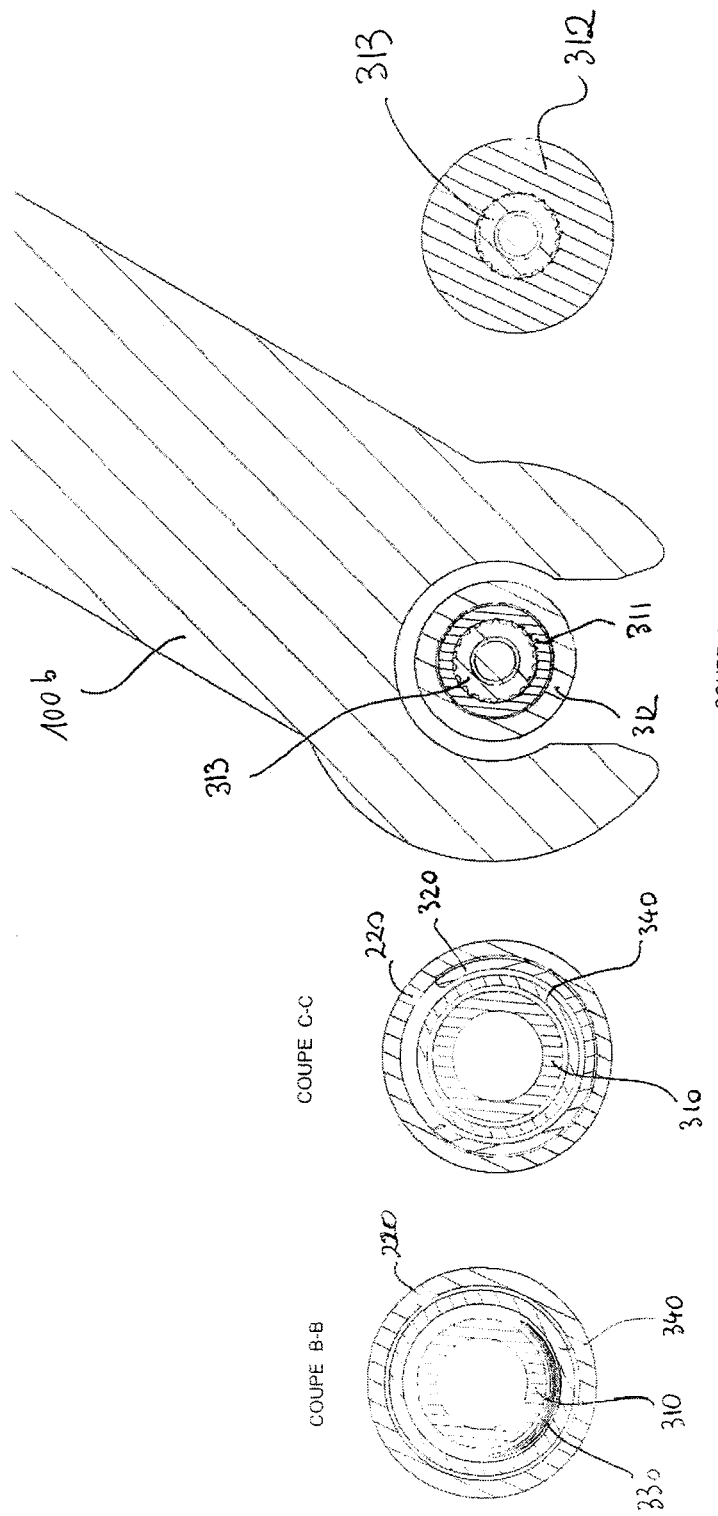

SKEWER AND HUB FOR CYCLE WHEEL

CROSS-REFERENCE TO RELATED APPLICATION

This application is based upon French Patent Application No. FR 15/01362, filed Jun. 29, 2015, the disclosure of which is hereby incorporated by reference thereto in its entirety, and the priority of which is claimed under 35 U.S.C. § 119.

BACKGROUND

1. Field of the Invention

The present invention relates to cycles and, more particularly, to quick-release and fastening assemblies for a cycle wheel to the fork of a bicycle frame.

The invention is particularly applicable to quick-release, and fastening, assemblies for fastening road bike and mountain bike wheels.

The invention also relates to a release/fastening assembly, including a skewer and a hub for such assembly, as well as a wheel and a cycle equipped with such a hub and assembly.

2. Background Information

Conventionally, a cycle wheel comprises a hub, a rim adapted to receive a tread and spokes or disks providing mechanical connection between the hub and the rim.

The hub comprises a hub body configured to be attached to the spokes or the discs and a hub shaft providing the mechanical connection of the hub to a front or rear fork of a bicycle frame.

The fork typically comprises two dropouts that are each attached to one of the ends of the shaft of the hub. The latter is therefore rotationally fixed when the rim rotates.

In the practice of sports cycling, one needs to be able to separate the wheel and the fork quickly and without tools in order, for example, to quickly assist a cyclist who has suffered a puncture with the repair, or simply for ease of transportation or storage of the bike.

A number of solutions have been proposed for quick release and fastening of the wheel to the fork.

These solutions are all based on the use of a skewer that extends through the shaft of the hub, with one end of the skewer projecting on each side of the hub. Each end of the skewer cooperating with one of the fork dropouts to enable the skewer to be fixed to the fork in the locked configuration and to enable the skewer to be removed from the fork in the unlocked configuration.

A first solution involves inserting each of the ends of the skewer into one the two bores carried by the dropouts. The patent documents EP 0810944 and U.S. Pat. No. 5,865,560 describe a solution of this type. Each bore of the dropouts has a passage slot for the bore to communicate with the outside and for inserting the skewer into the bore via movement through the passage slots. This movement is a mainly vertical movement when the cycle is in a rolling configuration.

A disadvantage of this type of solution is that, in the event of improper tightening of the skewer to the fork, the skewer may come out of the bores through the passage slots. The wheel may then separate from the frame when rolling, which may cause a fall with dramatic consequences.

To improve the safety of the cyclist, another solution provides for dropouts on the fork with bores that are closed, that is to say, devoid of passage slots. It is therefore necessary to insert the skewer through these bores along a direction corresponding to the axis of rotation of the wheel. One of the bores forms an internal thread into which a threaded end of the skewer is screwed. This solution, although satisfactory in terms of safety, has the disadvantage of requiring complete removal of the skewer from the hub during wheel replacement, which is time-consuming and tedious.

To overcome this disadvantage, another solution, such as that described in the patent document U.S. Pat. No. 6,089,675, provides a fork having a first dropout comprising a threaded bore without a passage slot and a second dropout comprising a non-threaded bore extended vertically by a passage slot. The hub/rod assembly may then be aligned with the two bores by passing the skewer through the passage slot of the second bore and then moving it along the axis of the skewer to engage the threaded end of the skewer with the threaded bore of the first dropout.

The aforementioned document describes a plurality of embodiments in which the skewer is pushed axially by a spring to pre-engage the threaded end of the skewer into the thread of the first bore.

The patent document US 2013/0270893 discloses an improvement over the aforementioned document by adding a skewer axial indexing system, which provides a stable open position for the skewer, despite the axial thrust of the return spring.

These solutions have the disadvantage of preventing or considerably complicating the extraction of the skewer from the hub. However, this extraction is necessary for the cleaning of these elements that are essential to the performance of the cycle or for replacing the wheel while keeping the same skewer.

These solutions also have a very specific hub design that makes them incompatible with commercially available skewers. Thus, a wheel of this type cannot be installed on a bike having a fork equipped with a standard skewer comprising two closed bores (devoid of passage slots). Such incompatibility drawback greatly limits the adoption of this concept by the end-user cyclist, the distribution network, and the hub manufacturer.

Furthermore, the handling of the skewer is complex.

In view of the foregoing, there is a need to provide a solution to overcome disadvantages mentioned above.

In particular, it would be very advantageous to have a robust, reliable, and economical solution that makes it possible to reduce, or even avoid, the risk of inadvertent detachment of the wheel while enabling easy dismounting thereof, easy extraction of the skewer out of the hub, and inter-compatibility of such a hub with already commercially available forks and rods.

SUMMARY

The invention provides a skewer for fastening a wheel to a cycle-type vehicle, such skewer comprising a rod extending along a longitudinal axis, a first end comprising an arrangement cooperating with the frame of the vehicle, and a second end comprising an arrangement capable of exerting a tightening torque, in which:

the rod comprises a groove, whose extension along the longitudinal axis has a length $L1$;

an element having a variable diameter and a length $L2$, the length $L2$ being less than $L1$, is received in the groove so as to be translationally movable along the longitudinal axis;

an elastic device longitudinally constrains the variable diameter element toward the second end.

According to a particular embodiment, over its entire length, the outer diameter of the rod does not exceed a value D1, and the diameter D2 of the variable diameter element, when in the free state, is greater than the maximum diameter D1 of the rod.

According to a particular embodiment, the variable diameter element is an elastic element, for example a split tubular ring whose diameter D2, when in the free state, is greater than the maximum outer diameter D1 of the rod.

According to a particular embodiment, the elastic device that longitudinally constrains the variable diameter element is a spiral spring having a diameter less than D1.

According to a particular embodiment, a distribution ring is interposed between the spring and the variable diameter element.

According to a particular embodiment, the arrangement positioned at the first end, which cooperates with the vehicle frame, is in the form of a thread, and/or the arrangement positioned at the second end, which is configured to cooperate with a device exerting a tightening torque, is in the form of a lever and/or key imprint.

The invention also provides an assembly comprising a skewer having the features mentioned in the preceding five paragraphs and a hub of a vehicle wheel, the hub comprising a hollow shaft, at least one portion of which has an inner diameter D3 and the other portions of which have an inner diameter greater than D3, as well as a hub body rotatably mounted on the shaft, whereby the diameter D3 is greater than the maximum diameter D1 of the rod and D3 is less than the diameter D2 of the ring, when in the free state.

In another embodiment of the invention, a releasable retention arrangement is provided between the hub and the skewer, so as to maintain the latter in a predetermined position in relation to the hub.

In such an embodiment, the releasable retention arrangement comprises an internal annular protrusion arranged within the distribution ring that is configured to cooperate with an external annular protrusion arranged at the surface area of the rod in the groove. The annular protrusions comprise conical portions of apex semi-angle α between 50° to 65°.

In one embodiment of the invention, the skewer rod comprises two distinct portions that are assembled to one another to form the complete skewer rod, the groove receiving the expansible ring being located at the interface between the two portions.

In another embodiment of the invention, the return mechanism comprises two or more springs arranged evenly at the circumference of the skewer rod.

BRIEF DESCRIPTION OF DRAWINGS

Other objects and advantages of the invention will become apparent upon reading the following description of particular embodiments of the invention, given by way of non-limiting examples, with reference to the annexed drawings, in which:

FIG. 3a is a transverse cross-sectional view of the dropout and the skewer in the position assumed by the latter in FIG. 3;

FIG. 4c is a schematic cross-sectional view illustrating the hollow shaft having a first portion having an inner diameter and other portions having an inner diameter greater than the inner diameter of the first portion;

FIG. 5a is an enlarged detail view of FIG. 5;

FIG. 5b is a transverse cross-sectional view of the fork leg and of the skewer in the position assumed by the latter in FIG. 5;

FIG. 5c is a transverse cross-sectional view of the dropout and the skewer during removal of the wheel;

FIG. 6a is a partial detailed view of FIG. 6;

FIGS. 10, 11, 12, 13, and 14 are transverse cross-sectional views of the third embodiment of the invention.

DETAILED DESCRIPTION

A first embodiment of the invention will now be described with reference to FIGS. 1 to 6.

Figure 1:
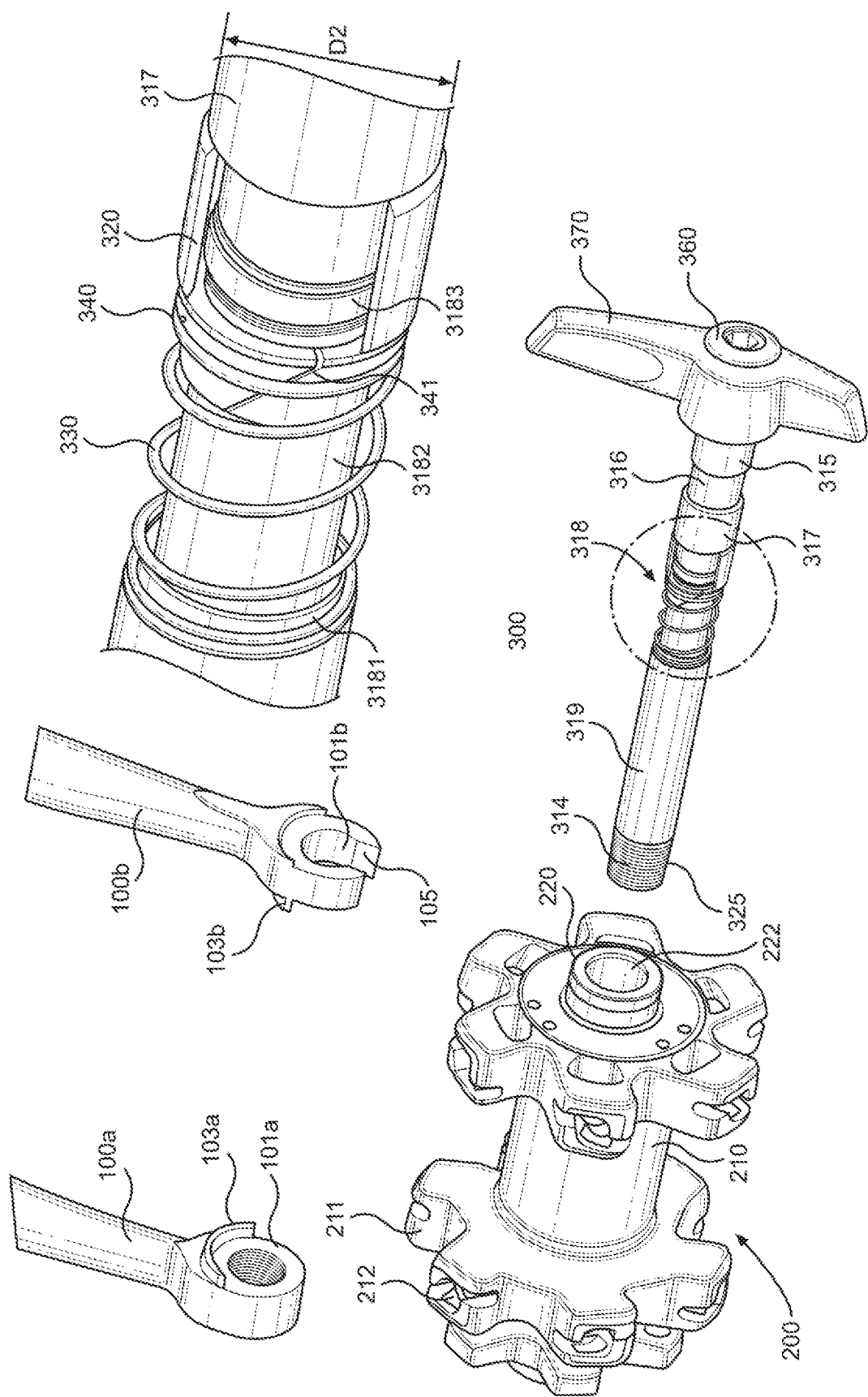
FIG. 1 is a perspective view of the hub and skewer assembly according to a first embodiment of the invention.

FIG. 1 shows the fork arms and the dropouts 100a, 100b of a frame fork.

The dropout 100a has a bore 101a at its end. This bore 101a is closed, that is to say that its circumference has no opening. It is threaded in the illustrated embodiment, although such internal threading is not limiting.

The dropout 100b has a bore 101b whose circumference is opened by a passage slot 105. The width of the slot 105 is less than the diameter of the bore 101b, so that the slot constitutes a narrowing of the bore.

The hub 200 has a hub body 210 having two flanges 211 comprising a plurality of housings 212 for the spoke heads, not shown. The remainder of the cycle wheel, namely the spokes, the rim, and the tire are also not shown.

The hub 200 also comprises a hub shaft 220 housed in the hub body 210 and configured to be fastened to the fork. When the wheel is attached, the shaft 220 is translationally and rotationally immobilized in relation to the fork. Thus, the hub body 210 rotates on the hub shaft 220 about an axis 11 referenced in FIG. 2.

The hub shaft 220 has an internal passage 222 extending, in the non-limiting embodiment, over its entire length and configured to be crossed by a rod 310 of the skewer 300, which has an internal passage 309.

The skewer rod 310 has an end 314 configured to penetrate into the bore 101a. In this non-limiting embodiment, the end 314 is threaded and is screwed into the thread of the bore 101a.

The first threads from the end are truncated so as to form an unthreaded end 325.

The skewer rod 310 includes a plurality of portions 315, 316, 317, 318, 319 on its outer surface, which are described below.

The end of the rod 310 opposite the threaded end 314 is configured to penetrate into the bore 101b, possibly through the passage slot 105, as described in detail below. This end is associated with a handle 370, affixed to the rod via the headed member 360, the handle being operable via pushing, rotating, pulling by the user to engage the skewer in the bore 101a, to screw it into the bore 101a, or to remove it from the fork, respectively.

The skewer comprises a groove 318 extending along the longitudinal axis over a length L1. The groove 318 receives a variable diameter element that, in this embodiment, takes the shape of a split tubular ring 320, an elastic biaser in the form of a coil spring 330 and a distribution ring 340 interposed between the two preceding elements.

Figure 4:
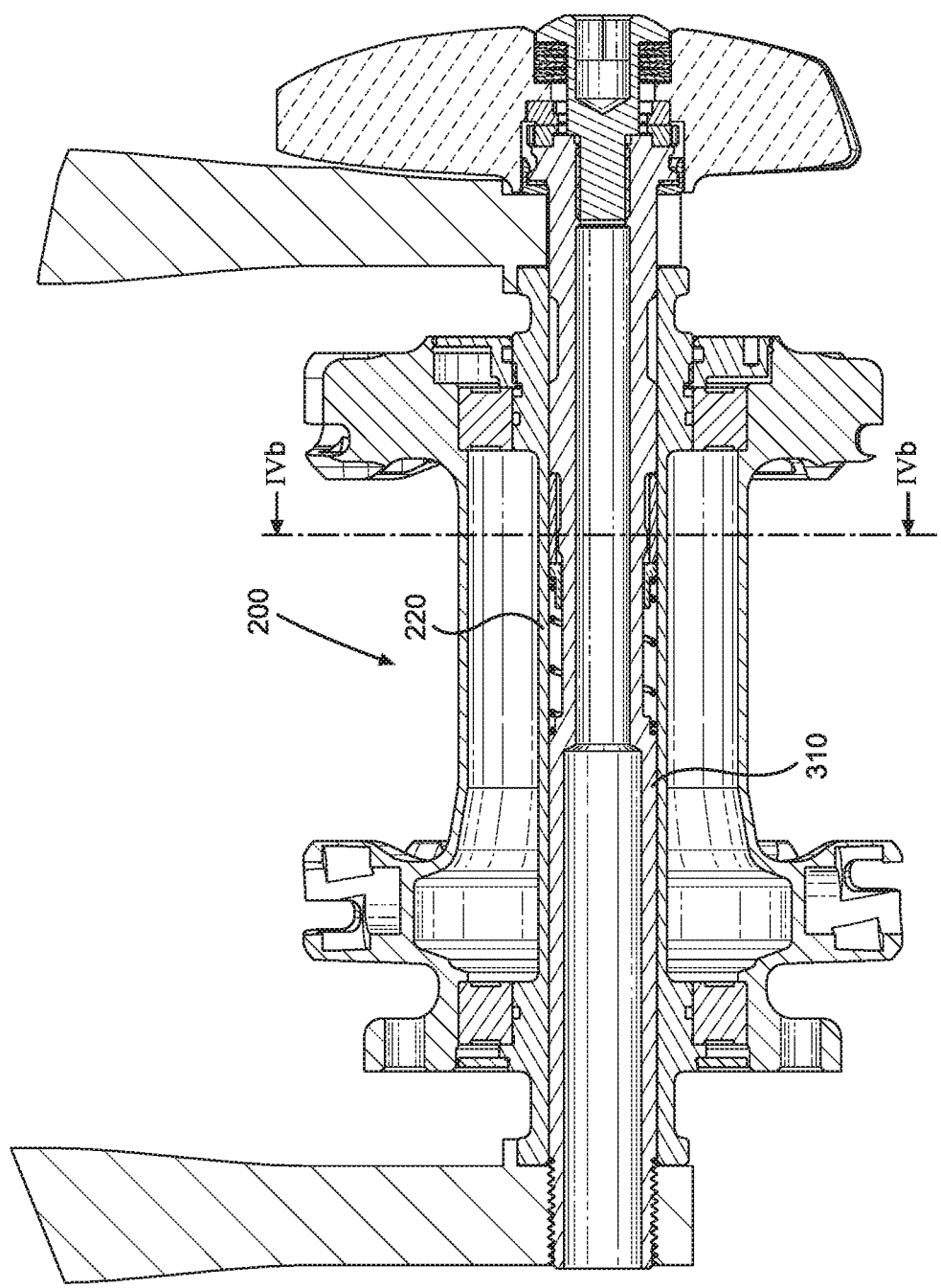
FIG. 4 is a cross-sectional view illustrating the assembly in the fully tightened position.
Figure 4A:
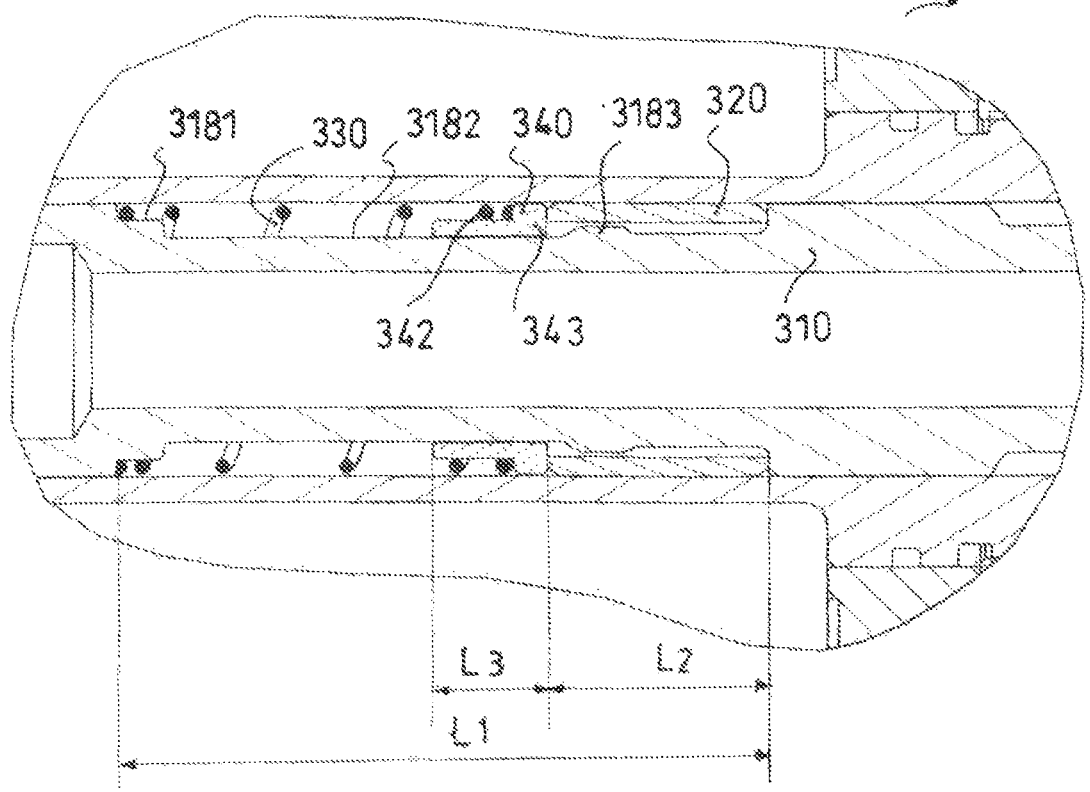
FIG. 4a is an enlarged detail view of FIG. 4.
Figure 4B:
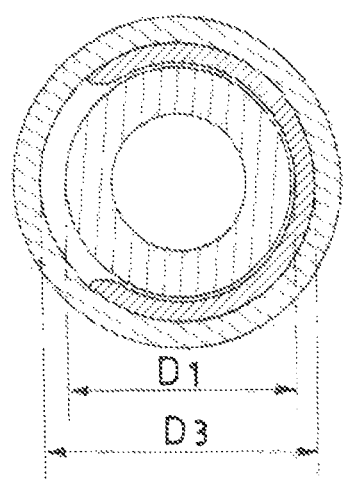
FIG. 4b is a transverse cross-sectional detail view of FIG. 4.

As shown in FIG. 4a, the bottom of the groove 318 does not have an identical diameter over the entire length thereof. Various cross sections of the groove are thus defined. Starting from the end of the groove that is closest to the end 314 of the skewer, there is a centering cross section 3181 for the spring, a sliding cross section 3182 for the distribution ring 340, and a centering cross section 3183 for the retractable ring 320.

In the embodiment described here, the skewer rod 310 is made in one piece, so that it is necessary to provide a slot 341 in the distribution ring to enable the mounting. In the illustrated embodiment, a distribution ring with a slot whose orientation forms a non-zero angle with the axis 11 is selected. Thus, the deformation of the ring during mounting presents less risk of damaging it by softening. For the same reasons of mounting, a spring is selected whose mechanical properties provide it with sufficient radial expansion to pass over portions of the rod that have a greater outer diameter than the spring diameter.

Other embodiments include a skewer rod made of at least two pieces, with an interface between the two pieces passing through the groove 318.

The positioning of the various elements in the groove then no longer poses a problem, and a distribution ring and a radially non-deformable spring can be used. These embodiments may comprise two elements screwed, locked, and possibly adhered into one another while ensuring that unscrewing cannot occur during use. Such embodiments are described below.

Figure 5:
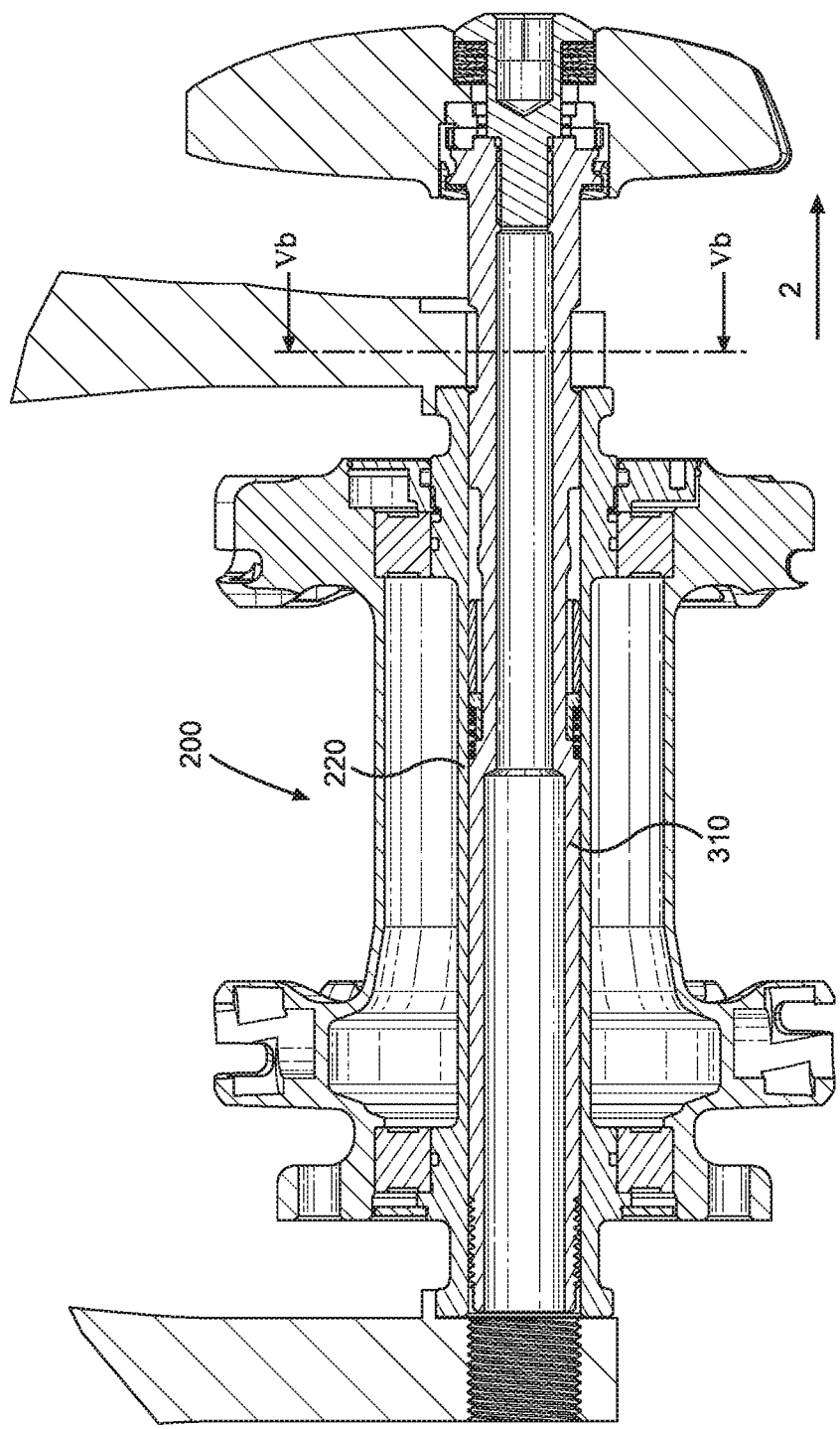
FIG. 5 is a cross-sectional view illustrating the assembly in the wheel mounting or dismounting position without complete extraction of the skewer.

The groove 318 is provided in the central portion of the skewer and not at the ends thereof. Indeed, when the skewer is positioned in the hub, the groove must be there in its entirety. This is shown in FIGS. 4 and 5, which correspond to the most common conditions of use of the skewer in a bicycle wheel hub. In practice, the groove 318 is positioned at a distance of at least 40 mm from the end 325 of the skewer. In the first embodiment, the groove is 90 mm away from the end of the skewer.

The distribution ring 340 comprises a spring centering portion 342 and an abutment portion 343, on which the tubular ring 320 takes support.

In the first embodiment, the split tubular ring 320 has a length L2 between 2.0 mm and 30 mm, or, in a more limited range, between 5.0 mm and 15 mm. Good results are obtained with a 10 mm long ring.

The outer diameter D2 of the tubular ring 320 is, in the free state, greater than the outer diameters of all of the portions 315, 316, 317, 318, and 319 of the rod 310. In practice, the diameter of the portions 315, 317, and 319 is substantially identical and is referenced D1. The diameter D1 corresponds to the maximum outer diameter of the rod 310.

This ring can be obtained from a rolled steel sheet that, in a non-limiting embodiment, is made of a high-yield point steel. Alternatively, it can be made of an aluminum alloy having high mechanical properties, such as 7075 aluminum alloy.

Though not limiting to the invention, the front edges of the ring are rounded by tumbling to facilitate insertion of the ring into the internal passage 222, as described below.

The first fixing of the hub 200 of the wheel to the fork using the skewer according to the invention will now be described.

Figure 2:
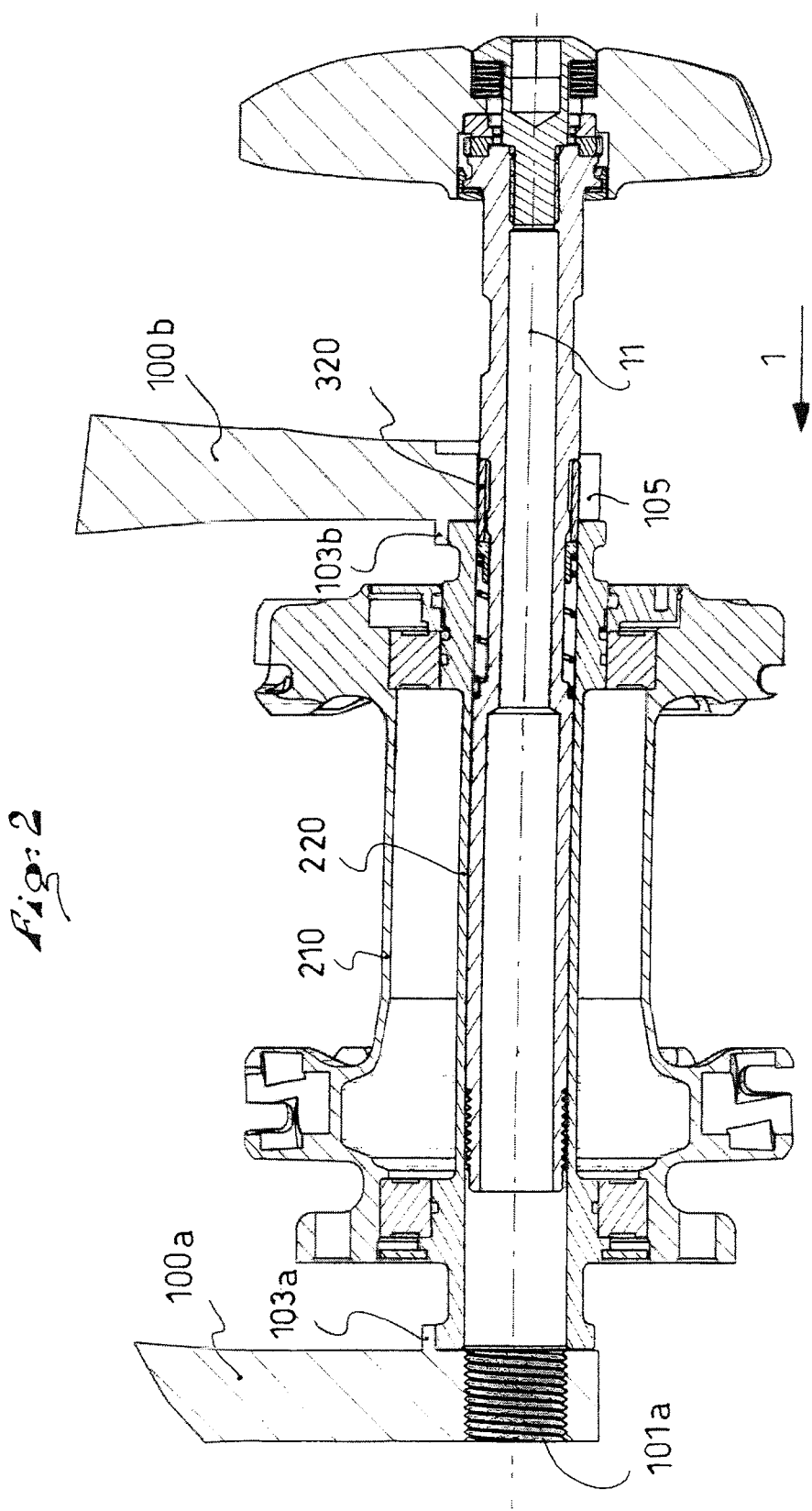
FIG. 2 is a cross-sectional view illustrating the first insertion of the skewer into the hub.

FIG. 2 illustrates a longitudinal cross section of a phase of the first insertion of the skewer 300 into the hub 200. It can also be the reinsertion of the skewer 300 into the hub. Beforehand, the skewer has been completely removed from the hub.

The user has positioned the wheel in the appropriate location. Respective support surfaces of the hub are in abutment with the vertical stops 103 and 103b. The internal passage 222 of the hub shaft 220 is aligned with the bores 101a and 101b of the dropouts 100a and 100b.

To insert the skewer, the user exerts an axial force along the direction of engagement 1.

It is through the aforementioned support surfaces and the stops 103a, 103b that the weight of the cycle and of the user is transmitted to the wheel. Thus, the skewer 300 does not take up the vertical load, or only very slightly takes up the vertical load, which thus does not interfere with its axial displacement and makes the assembly more robust, i.e., stronger.

The axial force exerted by the user must be sufficient to force a reduction in the diameter of the ring 320, on the one hand, and to slide the ring within the internal passage, on the other hand. Indeed, the outer diameter D2 of the ring, in the free state, is greater than the inner diameter D3 of the internal passage 222 of the shaft 220. The ring generates a radial force distributed on the internal passage 222. The coefficient of friction "f" between the ring and the internal passage 222 makes it possible to transmit an axial force Fa substantially proportional to the above-mentioned radial force and to the coefficient of friction between the ring and the internal passage. Thus, if a force less than Fa is exerted, the ring remains stationary in the internal passage. The ring starts to move only when this threshold is exceeded, in either direction.

Because the internal passage and the ring have their own manufacturing tolerances, insertion of the skewer into the internal passage causes a variable tightening of the ring (retraction of its outer diameter). The nominal tightening must therefore be markedly greater than the tolerance intervals.

For example, for a hub in which the inner diameter D3 of the internal passage varies between 12.02 mm and 12.12 mm, the maximum outer diameter D1 of the rod is dimensioned to 12.00 mm and the diameter D2 of the ring is dimensioned to between 12.45 mm and 12.55 mm. One can thus calculate the maximum tightening, which is equal to 0.53 mm, and the minimum tightening, which is 0.33 mm. In this case, the variation in tightening is about +/−25%, which is acceptable for the application.

By selecting a steel ring of 12.50 mm in diameter, 10 mm in length, and 0.85 mm in thickness, the force Fa is about +/−45 N along the direction of displacement of the skewer.

The force Fa is proportional (factor k) to the length (L2) of the ring, to the nominal tightening (S), and to the coefficient of friction (f):

$$Fa = k \cdot L2 \cdot S \cdot f$$

The factor k is notably a function of the ring material modulus and the thickness of the ring.

The user exerts a thrust along the axis 11 throughout this phase.

Figure 3:
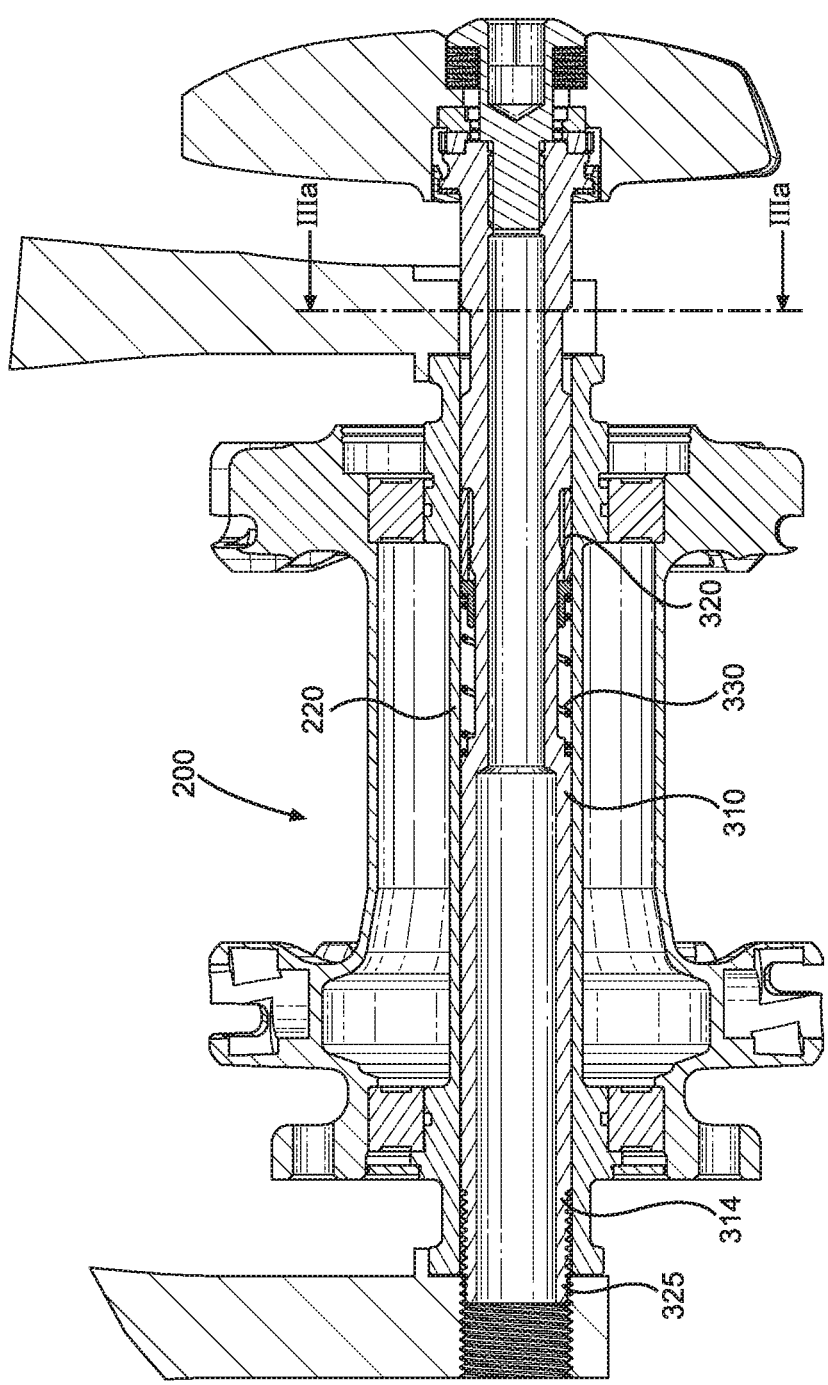
FIG. 3 is a cross-sectional view illustrating the position of the skewer at the end of the first insertion by thrust thereon, and prior to the screwing thereof.

FIG. 3 illustrates a longitudinal cross section of the end of the thrust phase. The end 325 of the rod 320 is now inserted into the bore 101a. The portion 315 is then already partially inserted into the bore 101b. The wheel is already confined by the cycle frame. Indeed, as shown in FIG. 3a, the diameter of the portion 315 is greater than the width of the passage slot 105.

Therefore, although the fixing process, that is, the locking of the wheel to the forks, is not completed, a first degree of safety is achieved in this state.

To finalize the wheel fixing process, the user exerts a torque in order to screw the threaded end 314 into the thread of the bore 101a. FIG. 4 illustrates the end of the screwing operation and the state of the skewer when the wheel is solidly fixed, or locked, to the cycle frame. FIG. 4a, which is a detail view of FIG. 4, shows the final position reached by the ring 320 at the end of the first insertion of the skewer. Until the skewer 300 is completely extracted from the hub 200, this position will not change. Thus, during a simple wheel dismounting, the ring remains in the same axial position in relation to the hub. The ring then actually constitutes an axial stop affixed to the hub, on which the spring that forces the skewer towards its engagement in the fork leg is supported. This axial stop is not affected as long as the axial force exerted on the skewer along the direction of extraction 2 does not exceed the threshold of force Fa required to slide the ring.

In the embodiment shown, the torque can be exerted manually via the skewer handle 370 or using a key. A torque limiter can be arranged within the handle, such as that described in the patent document EP 2070725 and U.S. Pat. No. 8,075,065, the disclosure of the latter of which is hereby incorporated by reference thereto in its entirety.

The dismounting and remounting of the wheel without complete extraction of the skewer will now be explained. The dismounting begins with a skewer loosening operation. At the end of this operation, the skewer is in the position shown in FIG. 3, with the exception of the ring 320, which is not in the position of FIG. 3 but in that of FIG. 4.

Also in this state, the user enjoys a certain level of safety because the wheel cannot leave its location without additional action from the user.

To be able to extract the wheel, the user must exert a tensile force on the skewer in the direction of extraction 2. This force must be sufficient to counter the return force of the spring but less than the aforementioned force Fa.

The traction exerted by the user on the skewer handle constrains the spring 330 until the spring centering portion 342 of the distribution ring 340 comes into abutment with the portion of the groove 318 that constitutes a centering cross section 3181 of the spring.

The skewer is then in the position shown in FIGS. 5, 5a, and 5b. The threaded end 314 and the end 325 of the skewer are out of the bore 101a. They are flush with the front surface of the hub shaft 220 and do not project therefrom.

Furthermore, the portion of the skewer rod 310 that is opposite the bore 101b is the wheel extraction portion 316 that has an outer diameter less than the maximum outer diameter D1 of the skewer and also less than the width of the passage slot 105 provided in the dropout 100b.

FIGS. 5b and 5c illustrate how the wheel can be extracted from the dropouts. The extraction portion 316 is able to pass into the slot 105.

The user must maintain the tensile force on the skewer handle throughout the wheel extraction operation. Indeed, the position illustrated in FIG. 5 is not a stable position, because the spring forces the skewer to return to the position of FIG. 3.

Once the wheel is extracted from the dropouts, the skewer naturally reassumes its equilibrium position within the hub of the wheel, that is to say its position shown in FIG. 3, with the exception of the ring 320, which is not the position of FIG. 3, but in that of FIG. 4.

The skewer remains affixed to the wheel throughout the wheel storage phase. There is indeed no risk of ill-timed extraction of the skewer from the hub, because it would require exerting a force greater than the aforementioned force Fa. Moreover, advantageously, the rod keeps the proper positioning in preparation for the next mounting of the wheel on the cycle.

To reposition the wheel, the user exerts and maintains a limited force (less than force Fa) on the skewer handle in the direction of extraction 2. The user thus positions the skewer in the position of FIG. 5. The wheel can then be positioned in its final location by aligning the internal passage 222 of the hub with the bores 101a and 101b.

When the user's tensile force on the handle is released, the skewer gets to the position of FIG. 3, the ring 320 being in the position of FIG. 4. It then suffices to apply the tightening torque to complete the attachment of the wheel.

For proper operation, the ring should not slide prior to reaching the state of FIG. 5, or in the state of FIG. 5 itself, even under the effect of the user's momentum. Therefore, the spring final force F' must be markedly less than force Fa. By defining the ratio R=F/F', one must ensure that this ratio R is greater than 2 or, in a more specific range of embodiments, greater than 5, and in an ideal range, between 8 and 80. By way of example, the system is entirely satisfactory with a maximum spring force F' of approximately 5 Newtons and a skewer extraction force Fa of approximately 50 Newtons, or a maximum spring force F' about 10 times less than Fa (R=5/50=1/10).

The invention also provides an assembly comprising a skewer having the features mentioned in the preceding description and a hub of a vehicle wheel, the hub comprising a hollow shaft, at least one portion 220A of which has an inner diameter D3 and the other portions 220B of which have an inner diameter D4 greater than D3, as well as a hub body rotatably mounted on the shaft, whereby the diameter D3 is greater than the maximum diameter D1 of the rod and D3 is less than the diameter D2 of the ring, when in the free state.

Figure 6:
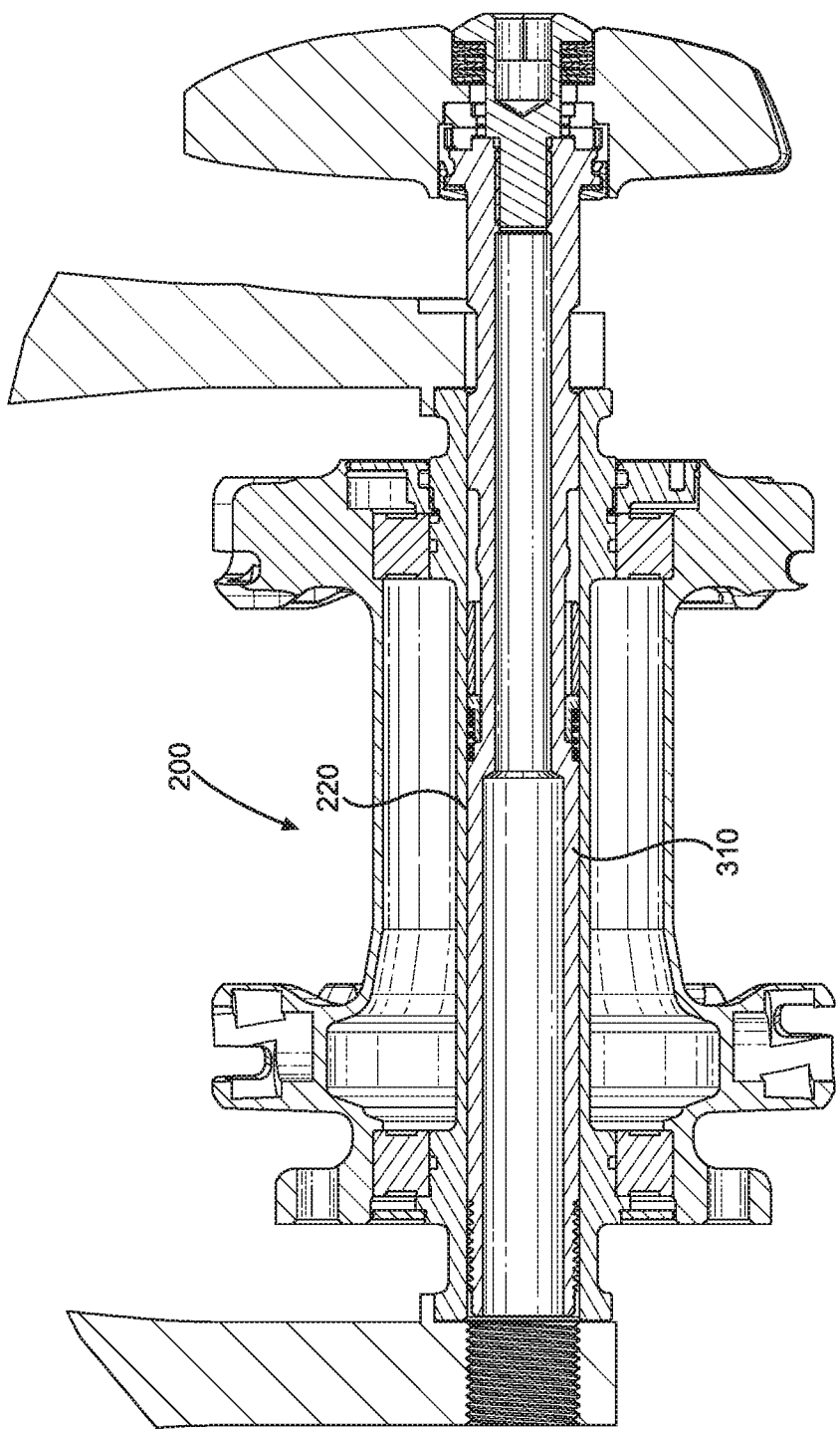
FIG. 6 is an overall cross-sectional view illustrating a second embodiment shown in the wheel mounting or dismounting position without complete extraction of the skewer, this second embodiment comprising a device for ensuring stability of this position.

FIG. 6 shows a second embodiment in which the mounting and dismounting position of the wheel has a stable position of the skewer rod, such that the return force of the spring 330 is retained by an indexing system. Thus, the user does not have to exert the tensile force on the skewer handle continuously throughout the wheel extraction (or positioning) phase.

The embodiment shown, for example, in FIG. 6a, which is a detailed partial view of FIG. 6, still comprises a retractable tubular ring 320 that is inserted in the inner housing 222 of the shaft 220. The distribution ring 3401 comprises at least one slot 341 enabling it to expand radially in order to be inserted into the portion 319 of the skewer rod 310. The slot 341 of the distribution ring 3401 is very narrow in this embodiment, so that when the spring 330 is inserted on the centering zone 342 of the distribution ring, it causes a radial stress on this centering portion 342 that makes it possible to close this slot; the centering ring is thus prestressed for closure by the end of the spring 330. In this second embodiment, the distribution ring 3401 is longer than in the first embodiment, and it is inserted radially with sufficient radial clearance under the split ring 320 to take another axial support 3503 at the other end of the latter; thus the distribution ring 3401 is guided by two bilateral axial supports with the split ring 320.

The hub/skewer according to the second embodiment of the invention comprises a releasable retention arrangement for maintaining the skewer in a second stable equilibrium position. This releasable retention arrangement is provided to oppose the return force of the spring 330, which tends to place the skewer in a configuration similar to that illustrated in FIG. 3. They are formed by the cooperation of elements of the skewer with elements of the rod. These elements are described below.

In its bore, the distribution ring 3401 comprises an annular protrusion 3501 projecting toward the axis 11 and comprising two conical surface portions that form, at an apex, angles $\alpha$ and $\beta$ that intersect at a radial plane.

In its portion 3182, the rod 3101 comprises an annular protrusion also comprising two conical surface portions that form, at an apex, angles $\alpha$ and $\beta$ that intersect at a radial plane.

Thus, with reference to FIG. 6a, the return force F' transmitted by the spring 330 to the distribution ring 3401 is opposed by the support on the conical portions 3502 and 3102 of angle $\alpha$ provided in the distribution ring 3501 and the skewer rod 310, respectively. The radial prestressing of the spring 330 on the end of the plastic ring is sufficient to prevent its expansion due to the action of the cone of angle $\alpha$. Thus, the position shown in FIG. 6a is indeed a stable open position despite the thrust of the spring 330, thus enabling the user to mount and dismount the wheel without having to manually counter the action of the return spring.

Figure 7:
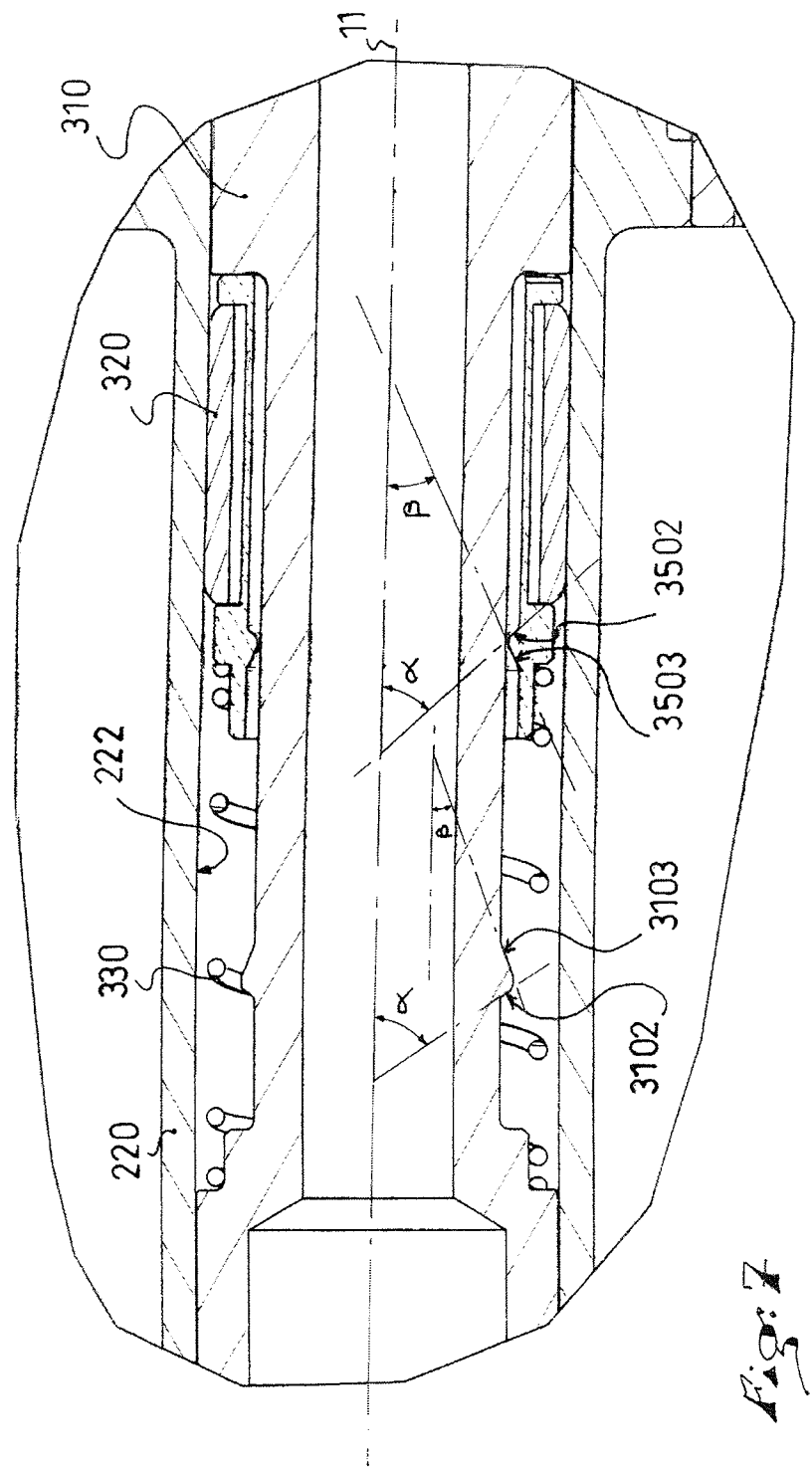
FIG. 7 is a detailed view of the second embodiment of FIG. 6 but shown in the fully tightened position.

From this stable position shown in FIGS. 6 and 6a, the passage to FIG. 7, in which the wheel is solidly locked to the frame or fork of the cycle, will next be described. FIG. 7 is a detailed partial view of a configuration of the skewer which, aside from the distribution ring 3401, is quite similar to that illustrated in FIG. 4 of the first embodiment.

Starting from the configuration illustrated in FIG. 6, the user exerts an axial thrust Pa in the direction of engagement 1, thus isolating the skewer rod 310, which is pushed in the direction 1 by the return spring 330 as in the first embodiment, on the one hand, but also by the user's thrust on the skewer handle 3701 in the direction 1, on the other hand. The sum of these two actions is initially opposed by the support reaction on the conical portions 3502 and 3102 of angle $\alpha$, provided in the distribution ring 3501 and the skewer rod 310, respectively. The reaction of the cone of angle $\alpha$ then tends to expand the split distribution ring and to exceed the radial prestressing threshold that the spring 330 exerts on the end of the distribution ring. This split distribution ring then radially expands and escapes the cone of angle $\alpha$ so as to engage, under the action of the spring 330 in the direction 1, towards a position comparable to FIG. 3 of the first embodiment.

To ensure good stability and great ease of use, the threshold of force Pa exerted by the user on the handle to switch the system should range between 0.5 and 3 times the maximum return force F' of the spring, such that the retaining force of the conical portions 3502 and 3102 of angle $\beta$, which is equal to the sum of Pa and F', is at least 1.5 (1+0.5) and 4 (3+1) times the force F' of the return spring. This force is transmitted to the split ring 320, which then relays this axial force by adhesion to the inner housing 222 of the shaft 220. It is therefore necessary for this second embodiment to dimension the tightening and the geometry of the split ring 320 so that the extraction force Fa is markedly greater than Pa+F'.

By defining the ratio R'=Fa/(Pa+F'), one must ensure that this ratio R' is greater than 2 or, in a more specific range of embodiments, greater than 4, and, in a more specific range, between 5 and 50. By way of example, the system is entirely satisfactory with a maximum spring force F' of about 5 Newtons, a force Pa of about 5 Newtons, and an axial force Fa of about 60 Newtons, or a ratio R' equal to 6.

To properly dimension the threshold of switching force Pa, it is advisable to properly dimension the radial prestressing of the spring on the distribution ring, as well as the angle $\alpha$ of the conical portion, in order to achieve the desired threshold. The angle $\alpha$ must be sufficiently open to properly retain the spring thrust, but not too much so as to allow the system to remain reversible without bracing, but in a non-limiting embodiment, the angle $\alpha$ should be between 50° to 65°; an angle of 55° can be considered a good compromise.

From this position shown in FIG. 3, it then suffices to turn the skewer handle 3701 to tighten the skewer rod and to solidly fix the wheel to the frame. This last position then corresponds to the detailed representation shown in FIG. 7.

The unlocking of the wheel for dismounting will next be described.

Starting from FIG. 3 and FIG. 7, the user first unscrews the skewer rod by turning the skewer handle 370 in the unscrewing direction to achieve a configuration similar to that shown in FIG. 3. From this position, the user pulls on the skewer handle 370 by compressing the spring 330 in a first step. This first phase is then mechanically analogous to the representation of FIG. 7, until the conical portions 3103 and 3503 of angle $\beta$ provided in the distribution ring 3401 and the skewer rod 310, respectively, expand the distribution ring 3501 by exceeding the radial prestressing of the spring 330 and thus reset the system. It is then necessary to provide a clearance J (FIG. 6) so that the distribution ring 3401 can be closed and locked again upon its return to the conical portions of angle $\alpha$.

The angle $\beta$ selected is to be sufficiently small to prevent the resetting force from being too high and the user from sliding the split ring 320; an angle $\beta$ of 5° to 20° is well suited.

The distribution ring 3401 of this second embodiment can be made of a thermoplastic material with very good friction properties to provide the advantage of good mechanical reversibility of the cones of angles $\alpha$ and $\beta$.

A third embodiment of the present invention will next be described with reference to FIGS. 8 to 14.

Figure 8:
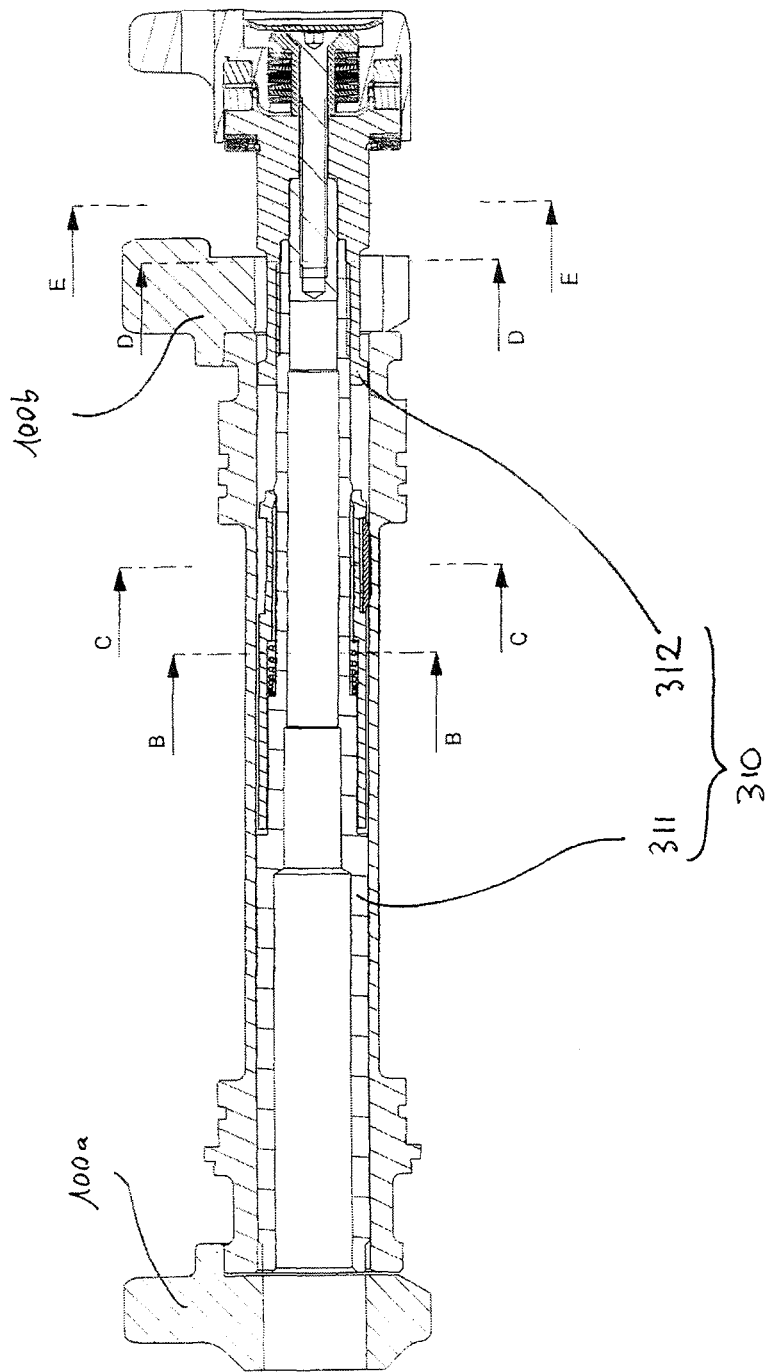
FIGS. 8 and 9 are longitudinal cross-sectional views of a third embodiment of the invention.
Figure 9:
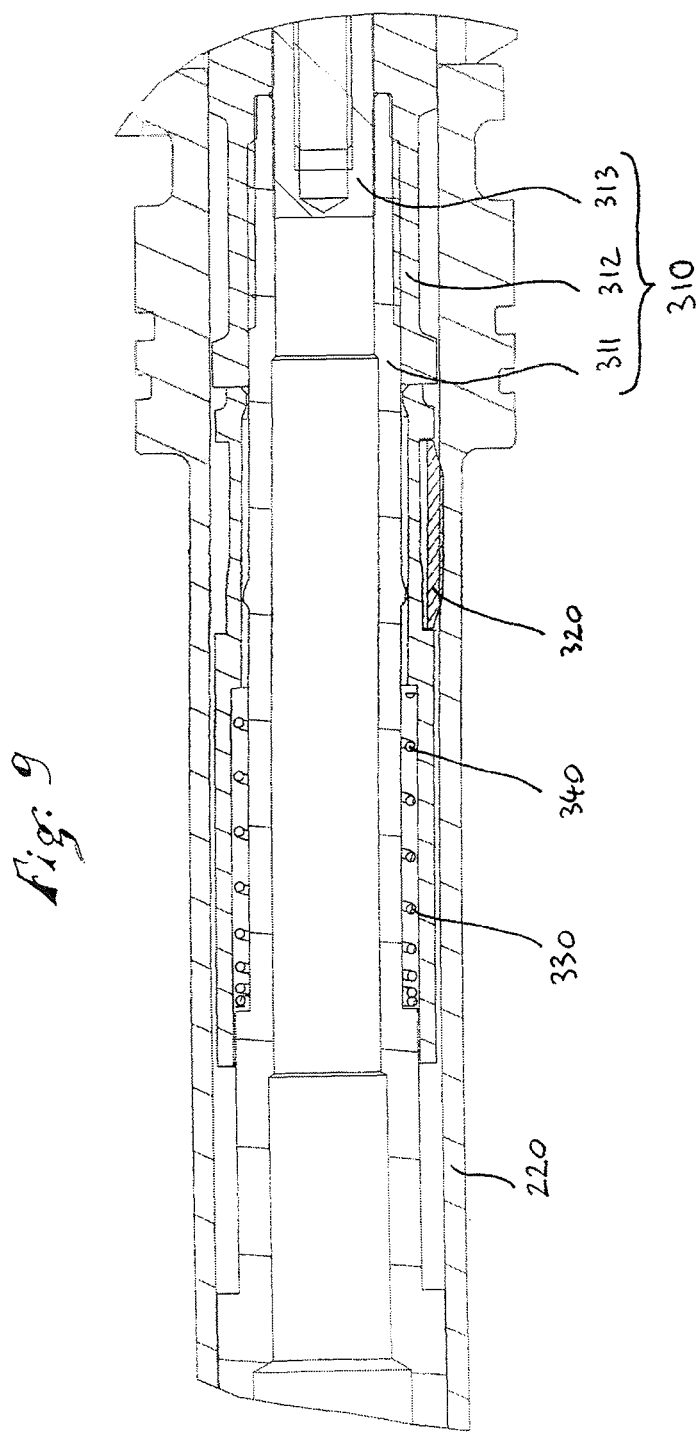

FIG. 8 is a longitudinal cross-sectional view when the skewer is in the retracted position in the hub. FIG. 9 shows a similar enlarged cross section, when the skewer is screwed into the fork.

In this version, the skewer rod 310 includes a plurality of separate elements that are assembled to one another after the tubular ring 320, the distribution ring 340, and the spring 330 are positioned in the groove 318.

As shown in FIGS. 8, 9, and 11, and as was the case in the previously described version, the distribution ring 340 is inserted radially under the tubular ring 320 and surrounds the latter via two axial supports so that the tubular ring and distribution ring are longitudinally affixed to one another.

Similarly, the distribution ring 340 is also provided with a releasable retention arrangement that makes it possible to maintain the skewer in the retracted position, against the return force of the spring 330. The releasable retraction arrangement is positioned at a first end of the distribution ring and functions similarly to that described in the previous embodiment, and is not be described here in detail.

The distribution ring nevertheless has certain characteristics that are not present in the second embodiment of the invention. First, the first end of the distribution ring has a cross-sectional shape that is not exactly circular, but is similar to that of a double ogive. This particular shape, shown in FIG. 14, defines two contact points 344, diametrically opposed and located at the intersection of the bases of the two ogives. The vertices 345 of the two ogives constitute the other two characteristic points of the cross section of the end of the ring. This particular shape guarantees a specific deformation of the ring when the contact points slide on the conical portion 3103 formed on the skewer rod. The two contact points move apart from one another and the two ogive vertices come closer to one another. Thus, the retention ring can pass over the annular protrusion provided on the rod.

The other characteristic of the distribution ring is that it includes an extension that covers the spring 330, regardless of the position of the distribution ring. This extension keeps the spring in place and protects it from dirt.

Moreover, the skewer rod 310 includes a main portion 311 and an end portion 312 that carries the skewer handle and is screwed to the end of the main portion. A splined rod 313, inserted into the main portion 311 and end portion 312, ensures the transmission of torque between the two portions of the skewer.

The two-part construction of the skewer facilitates the assembly of the various rings and of the spring in the groove 318. It is therefore no longer necessary to enlarge the diameter of the spring and of the distribution ring in order to position them in the groove.

Figure 14:
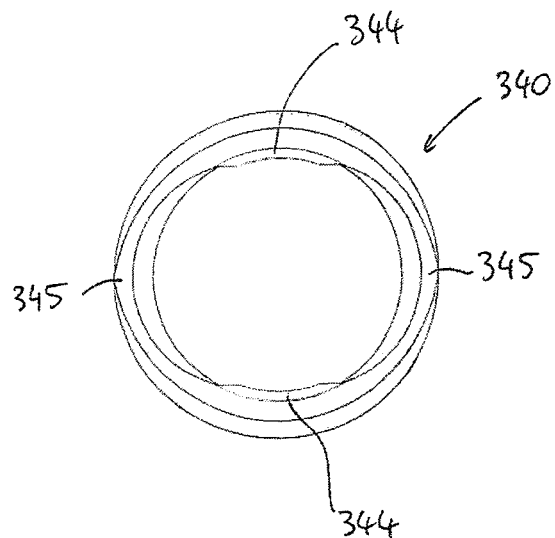
Figure 15:
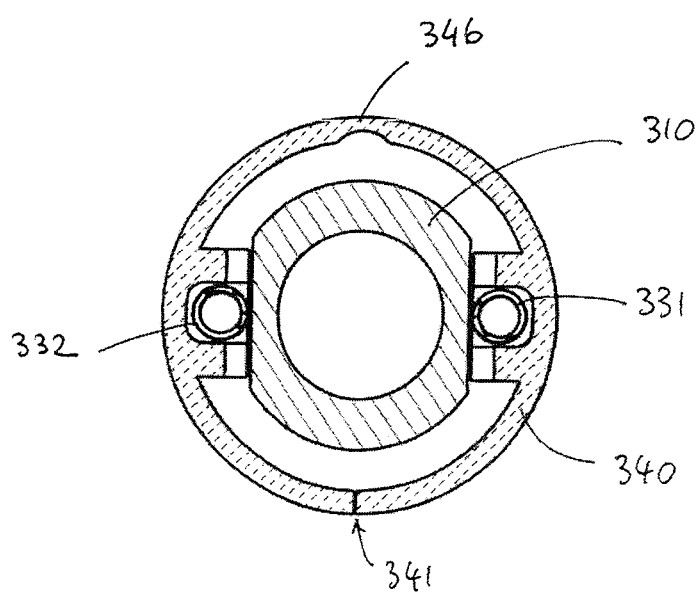
FIG. 15 is a transverse cross-sectional view of a fourth embodiment of the invention.

FIG. 15 shows a cross-sectional view of a fourth embodiment of the invention. This embodiment is a variant of the previous embodiment; and FIG. 14 is a cross section similar to that of FIG. 9.

The fourth embodiment of the invention differs from the third embodiment in that the skewer rod 310 is made in one piece, and in that the single spring surrounding the skewer is replaced by two small springs 331, 332 that are positioned on opposite sides of the skewer rod 310, that is, the springs are circumferentially spaced apart around a circumference of the rod.

The distribution ring 340 has a slot 341 extending longitudinally over its entire length, as well as a weakened zone 346 diametrically opposite the slot. It is therefore possible to open the distribution ring 35 to allow its positioning with the two springs 331 and 332.

Further, at least because the invention is disclosed herein in a manner that enables one to make and use it, by virtue of the disclosure of particular exemplary embodiments, such as for simplicity or efficiency, for example, the invention can be practiced in the absence of any additional element or additional structure that is not specifically disclosed herein.

The invention claimed is:

1. A skewer for fixing a wheel to a cycle vehicle, comprising:
  a rod extending along a longitudinal axis, the rod comprising:
    a first end having a structure configured to cooperate with a frame of the cycle vehicle; and
    a second end having a structure configured to transmit and to exert a tightening torque;
    a groove formed on an outer surface of the rod, the groove extending along the longitudinal axis, the groove having a length;
  an element having a variable diameter and a length less than the length of the groove, the element being received within the groove so as to be translationally movable along the longitudinal axis; and
  an elastic biaser longitudinally constraining movement of the variable diameter element towards the second end of the rod.

2. The skewer according to claim 1, wherein:
the variable diameter element is elastic.

3. The skewer according to claim 2, wherein:
the rod has an outer diameter, over an entire length of the rod, that does not exceed a maximum diameter of the rod; and
the variable diameter element has a diameter, when in the free state, that is greater than the maximum diameter of the rod.

4. The skewer according to claim 3, wherein:
the variable diameter element is a split tubular ring.

5. The skewer according to claim 1, wherein
the elastic biaser that longitudinally constrains the variable diameter element is a coil spring having a diameter less than a maximum diameter of the rod.

6. The skewer according to claim 5, further comprising:
a distribution ring interposed between the coil spring and the variable diameter element.

7. The skewer according to claim 1, wherein:
the structure positioned at the first end of the rod, which cooperates with the vehicle frame, is threaded.

8. The skewer according to claim 1, wherein:
the structure positioned at the second end of the rod, which transmits and exerts a tightening torque, comprises one of a lever and a key imprint.

9. The skewer according to claim 1, wherein:
the rod comprises two distinct portions assembled to one another so that the groove is positioned at the interface between the two rod portions.

10. The skewer according to claim 1, wherein:
the elastic biaser comprises a plurality of springs circumferentially spaced apart around a circumference of the rod.

11. An assembly comprising:
a skewer comprising:
  a rod extending along a longitudinal axis, the rod comprising:
    a first end having a structure configured to cooperate with a frame of a cycle-type vehicle; and
    a second end having a structure configured to transmit and to exert a tightening torque;
    a groove extending along the longitudinal axis, the groove having a length;
    an outer diameter, over an entire length of the rod, that does not exceed a maximum diameter of the rod; and
  a split tubular ring having a variable diameter and a length less than the length of the groove, the variable diameter split tubular ring being received within the groove so as to be translationally movable along the longitudinal axis;

the variable diameter split tubular ring having a diameter, when in the free state, that is greater than the maximum diameter of the rod;

an elastic biaser longitudinally constraining movement of the ring towards the second end of the rod; and a hub of a vehicle wheel, the hub comprising;

a hollow shaft configured to receive the rod, the hollow shaft comprising:

at least a first portion having an inner diameter;

other portions having an inner diameter greater than the inner diameter of the first portion;

a hub body rotatably mounted on the hollow shaft;

the inner diameter of the first portion of the hollow shaft being greater than the maximum diameter of the rod; and the inner diameter of the first portion of the hollow shaft being less than the diameter of the variable diameter split tubular ring, in the free state;

the variable diameter split tubular ring being configured to remain within the hollow shaft of the hub at least during a fully tightened position of the assembly.

12. The assembly according to claim 11, wherein:

a releasable retention arrangement is provided between the hub and the skewer so as to maintain the skewer in a predetermined position in relation to the hub.

13. The assembly according to claim 12, wherein:

the releasable retention arrangement comprises an internal annular protrusion provided within a distribution ring interposed between the elastic biaser and the variable diameter split tubular ring, the distribution ring being configured to cooperate with an external annular protrusion provided on a surface area of the rod in the groove.

14. The assembly according to claim 13, wherein:

each of the internal and external annular protrusions comprises a conical surface portion forming an angle $\alpha$ between 50° to 65° in relation to the longitudinal axis.

* * * * *